G. BOWER.
REVOLVING HARROW.
APPLICATION FILED DEC. 6, 1913.
1,133,919.
Patented Mar. 30, 1915.
2 SHEETS—SHEET 2.
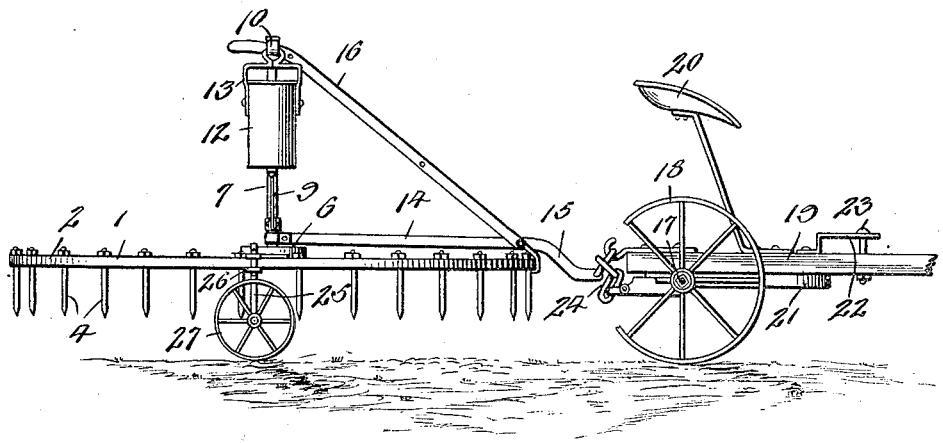
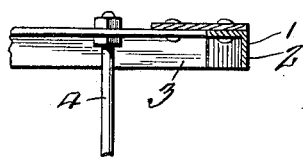
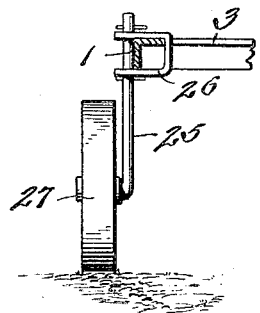
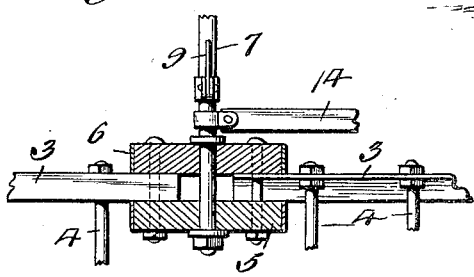
Witnesses
Inventor
G. Bower,
By Victor J. Evans
Attorney

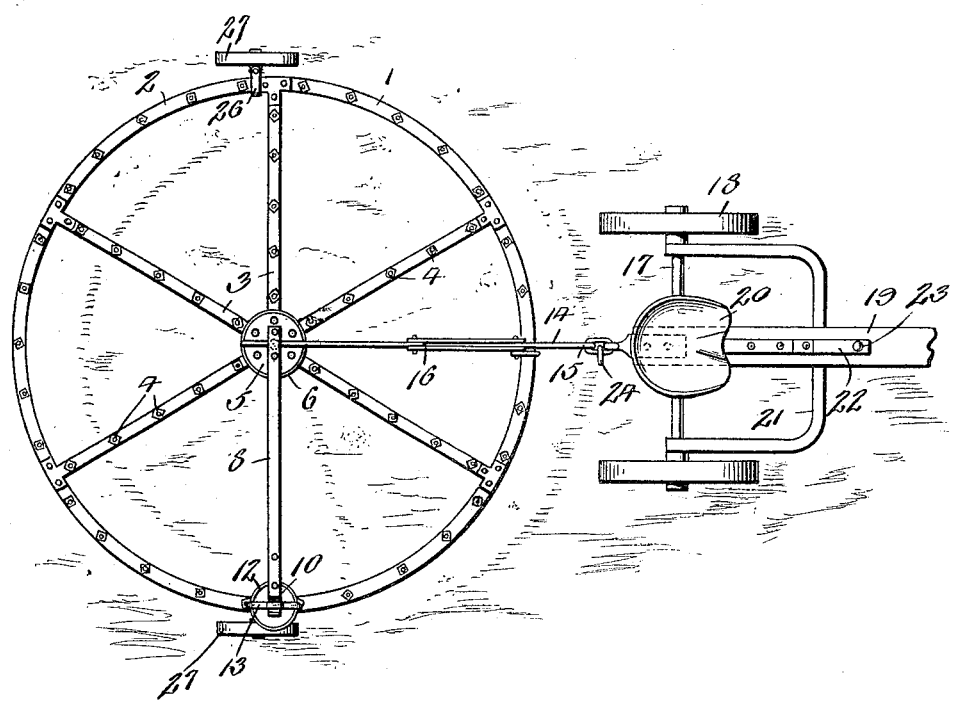

UNITED STATES PATENT OFFICE.

GEORGE BOWER, OF OTIS, KANSAS.

REVOLVING HARROW.

1,133,919.  Specification of Letters Patent.  Patented Mar. 30, 1915.

Application filed December 6, 1913. Serial No. 805,103.

*To all whom it may concern:*

Be it known that I, GEORGE BOWER, a subject of the Czar of Russia, residing at Otis, in the county of Rush and State of Kansas, have invented new and useful Improvements in Revolving Harrows, of which the following is a specification.

This invention relates to revolving harrows and it consists in the novel features hereinafter described and claimed.

An object of the invention is to provide a harrow of the type described which is of simple and durable structure and which includes a frame or superstructure to the lower portion of which is journaled a rotating circular member having teeth provided at its peripheral portion and at its spokes. A weight is mounted upon the said frame or superstructure to one side of the center of the said revolving member and serves to hold the teeth at one side portion of the revolving member at a deeper distance in the soil than the teeth at the other side thereof and consequently the said member rotates or revolves as it is drawn over the surface of the soil and the teeth accomplish the harrowing or pulverizing operation. A truck is connected with the forward end portion of the said frame or superstructure and an operator's seat is mounted upon the truck.

When the harrow is transported from point to point supporting wheels may be positioned under the opposite side edges of the said rotating member whereby the teeth thereof are elevated above the surface of the ground and when in this position the harrow may be readily moved from point to point.

In the accompanying drawings:—Figure 1 is a top plan view of the harrow. Fig. 2 is a side elevation of the same. Fig. 3 is a transverse sectional view of the same. The other figures are detailed views of the several features thereof.

The harrow includes a member 1 which consists of a circular rim 2 of angle iron and radially disposed spokes 3 also of angle iron. Teeth 4 are mounted upon the rim 2 and spokes 3 and are of any usual pattern employed for harrowing soil. Disks 5 are fixed to the inner ends of the spokes 3 at the opposite sides thereof and the said disks are bound by iron rings 6.

The frame or superstructure of the harrow comprises a shaft 7 upon the lower end portion of which the disks 5 are journaled. An arm 8 is fixed to the upper end of the shaft 7 and extends over one side portion of the member 1 approximately at a right angle to the line of direction or line of draft on which the harrow moves. A brace 9 is connected at one end with the lower portion of the shaft 7 at a point above the uppermost disk 5 and the said brace is connected at its upper end with the outer portion of the arm 8. The arm 8 is provided at its outer end with a hook 10 and a bracket 11 is attached to the arm 8 and extends down under the said hook 10. A bucket 12 is adapted to rest at its bottom upon the outer portion of the bracket 11 and the bail 13 of the said bucket is turned over the hook 10. The said bucket is adapted to contain scraps of iron or other suitable material whereby the bucket and its contents serve as a weight for depressing one side portion of the member 1 so that the teeth of the depressed side portion of the said member will enter deeper into the soil than the teeth at the other sides thereof. A draft bar 14 is fixed at its rear end to the lower portion of the shaft 7 and extends forwardly over the forward edge of the rim 2 and then extends down below the upper surface of the rim and terminates in a forward extremity 15. A brace 16 is connected at its upper rear end to the upper portion of the shaft 7 and at its lower forward end to the forward portion of the draft bar 14 at a point behind the forward edge of the rim 2.

A truck is used to draw the harrow and the said truck comprises an axle 17 having ground wheels 18 journaled at the ends thereof. A tongue 19 is mounted upon the intermediate portion of the axle 17 and an operator's seat 20 is mounted upon the rear portion of the tongue. A U-shaped brace 21 is connected at its intermediate portions to the rear portion of the tongue and the ends of the said brace are connected with the axle 17 in the vicinity of the wheels 18. A clip 22 is mounted upon the tongue 19 and is provided with a bolt 23 upon which may be mounted a single or double tree. A series of links 24 is connected with rear portion of the tongue 19 and the forward end or extremity 15 of the draft bar 14.

From the above description it will be seen that as the harrow is drawn over the soil the teeth at one side of the member 1 will enter into the soil at a greater depth than the teeth of the opposite sides and consequently as the member is moved in a forward direction the said member is caused to rotate and all of the teeth carried by the rim 2 and the spokes 3 will move in the soil and harrow or pulverize the same.

When it is desired to move the harrow from point to point with the teeth 4 elevated above the surface of the ground spindles 25 are applied to the opposite sides of the edge of the rim 2 and are held by means of clips 26 which are passed around the rim and secured to the spindle in any suitable manner. Wheels 27 are journaled for rotation at the lower portions of the spindles 25 and are adapted to travel upon the ground. Consequently it will be seen that the said spindles 25 will hold the member 1 in an elevated position so that the lower ends of the teeth 4 will be raised above the surface of the ground. When the said spindles are applied as above indicated it is apparent that the harrow may be readily transported from point to point.

Having described the invention what is claimed is:—

A revolving harrow comprising a superstructure including a draft bar, a shaft fixed to the rear end of the draft bar, an arm extending from the upper portion of the shaft approximately at a right angle to the draft bar and having a hook located at its outer end, a bracket depending from the outer portion of the bar, a receptacle adapted to rest upon the bracket and having a handle detachably engaging the hook, and a member journaled at the lower portion of the shaft and having harrow teeth.

In testimony whereof I affix my signature in presence of two witnesses.

GEORGE BOWER.

Witnesses:
JOHN KOEHLER,
JOHN C. OCHS.

Copies of this patent may be obtained for five cents each, by addressing the "Commissioner of Patents, Washington, D. C."